United States Patent [19]

Payne

[11] Patent Number: 5,329,982
[45] Date of Patent: Jul. 19, 1994

[54] METHOD AND APPARATUS FOR INTERNAL COMBUSTION ENGINE COOLANT EXTRACTOR/INJECTOR WITH COUPLING

[76] Inventor: Gerry E. Payne, 1455 Pratt Hwy., Birmingham, Ala. 35214

[21] Appl. No.: 118,390

[22] Filed: Sep. 7, 1993

Related U.S. Application Data

[63] Continuation-in-part of Ser. No. 760,709, Sep. 16, 1991, Pat. No. 5,242,373.

[51] Int. Cl.$^5$ .............................................. F04F 1/02
[52] U.S. Cl. ......................................... 165/1; 165/95; 417/149
[58] Field of Search ............... 417/118, 122, 148, 149; 123/41.14; 165/1, 95, 71

[56] References Cited

U.S. PATENT DOCUMENTS

| | | | |
|---|---|---|---|
| 3,310,002 | 3/1967 | Wilburn | 417/149 |
| 3,730,647 | 5/1973 | Lonardo | 417/122 |
| 3,780,757 | 12/1973 | Jordan | 137/205 |
| 4,770,611 | 9/1988 | Heyl | 417/147 |
| 4,901,786 | 2/1990 | Vataru et al. | 165/1 |
| 4,911,211 | 3/1990 | Andersen | 141/7 |

FOREIGN PATENT DOCUMENTS

| | | | |
|---|---|---|---|
| 492078 | 9/1938 | United Kingdom | 417/139 |
| 2086488A | 5/1982 | United Kingdom | 417/118 |

*Primary Examiner*—Allen J. Flanigan
*Attorney, Agent, or Firm*—L. F. Hilbers

[57] ABSTRACT

An internal combustion engine coolant extractor/injector with coupling comprises a tank assembly, an air pressure control assembly and a hose assembly. The air pressure control assembly creates a vacuum in the tank assembly by using the venturi effect. The air pressure control assembly does this by connecting to a compressed air hose. The air from the air hose flows through a venturi chamber creating a vacuum. The vacuum forces air out of the tank, creating a vacuum in the tank. The vacuum is maintained in the tank by means of a valve.

A transfer hose is also connected to the tank. The transfer hose is inserted into an automobile radiator; in the alternative, the transfer hose is connected to an automobile radiator by means of a coupling. The valve is then opened. The vacuum in the tank pulls coolant out of the radiator through the transfer hose and into the tank.

Coolant is injected or reinjected into the radiator by increasing the air pressure inside of the tank. A Schraeder valve on the tank is connected to a compressed air hose. Air flows into the tank through the Schraeder valve until the inside of the tank reaches the necessary air pressure. When the desired air pressure level is reached, as determined by an air pressure gauge connected to the tank, the compressed air hose is removed from the Schraeder valve which maintains this pressure. The open end of the transfer hose is then inserted into an automobile radiator or connected to it by means of the coupling, and the valve is opened. The increased pressure inside of the tank forces coolant out of the tank, through the transfer hose, and into the radiator.

5 Claims, 6 Drawing Sheets

METHOD AND APPARATUS FOR INTERNAL COMBUSTION ENGINE COOLANT EXTRACTOR/INJECTOR WITH COUPLING

CROSS-REFERENCE TO RELATED APPLICATIONS

This is a continuation-in-part of U.S. patent application Ser. No. 07/760,709 filed on Sep. 16, 1991, now U.S. Pat. No. 5,242,373.

BACKGROUND OF THE INVENTION

I. Field of the Invention

This invention relates generally to a method and apparatus for removing a fluid from or injecting a fluid into a container, and more particularly to a new method and apparatus for removing coolant from and installing coolant into an internal combustion engine.

II. Prior Art and Other Considerations

Over-heating is a major cause of vehicle breakdowns on highways. Engine cooling systems must operate efficiently to avoid costly repairs that result from excessive temperature. Cooling systems contaminated by rust, scale build-up and sludge cannot provide adequate heat transfer and cooling system efficiency; in addition, thermostats fail to open, hoses deteriorate, impellers bind or break-off and engine blocks can become distorted or cracked.

An effective cooling system is not only important for engine performance and life, but in many automobiles the transmission fluid is also cooled by circulation through the radiator. Further, the abrasive nature of the suspended corrosive materials increases the wear on water pump, hoses, thermostat, and heater core. And malfunction of cooling system components is a frequent cause of highway breakdowns.

To prevent the accumulation of deposits it is known to drain and flush the water circulation system from time to time. Flushing generally takes place by opening the system at a low point to allow drainage of water through the engine block or heater, and the pressure of the flushing water is low. Flushing agents which tend to remove deposits from the walls of the passages making up the system are sometimes used to enhance the effectiveness of flushing.

A further complication is the presence of the customary thermostat in one of the conduits connecting the engine to the radiator. At the temperature of water for flushing supplied from the mains, the thermostat will normally be closed and will impede effective flushing. Removal of the thermostat may assist flushing, but substantially increases the laboriousness of the flushing operation.

Accordingly, there for, the vehicle maker's recommendation that the old coolant be flushed out and replaced with fresh coolant every two years, should be followed. However, most (about 78%) of the antifreeze sold every year is sold to do-it-yourselfers. And, only 30% of these buyers change their antifreeze regularly, instead of just adding more when needed. Moreover, it is likely that many within this 30% who change their antifreeze are, in fact, only removing the old coolant and corrosion materials from the radiator, and not from the whole system.

There is a need for efficient engine cooling system flushing methods and apparatus; however, flushing of such systems in the past required draining of the removed liquid to sewer or waste lines, which was environmentally objectionable.

Thus need has developed for apparatus and method to clean engine coolant systems without such drainage. No way was known for accomplishing this objective in the usually advantageous manner as is now provided by this Invention.

There are presently three general approaches an individual vehicle owner may follow to drain and flush old coolant and corrosion from the entire cooling system—not just the radiator. All have their drawbacks.

Consider first the continuous flushing technique utilized by some professional equipment and some kits sold for do-it-yourself use. With this technique, a sealed connection must be made by installing a garden hose-coupled inlet tee ("T") in the cooling system. This is accomplished by cutting into a heater hose and installing the inlet "T" between the severed hose ends. With the radiator drain cock open, the radiator cap off, and the engine running to keep the thermostat open, water is continuously admitted through the inlet "T" and circulated by the water pump, displacing old coolant which discharges through the radiator drain and the radiator cap neck. After a sufficient period of time, drainage clarity indicates that old coolant and corrosion have been displaced by clean water.

For someone who is not an automotive service technician, utilizing this continuous flushing approach is complicated and generates a large volume of waste liquid.

A second method which may be used involves opening up the cooling system at multiple points. With this approach the thermostat, heater hose and the lower engine-to-radiator hose are removed, and the drain cocks on the engine and the radiator are opened. It is then possible to flush water through the various parts of the system without the need to install a permanent inlet "T" or run the engine to keep the thermostat open. However, there are also problems of complexity and waste liquid.

The third method of draining and flushing the entire cooling system involves repeatedly draining the radiator, refilling it with water, and running the engine at normal operating temperature. This causes the thermostat to open and permits the coolant previously trapped in the engine, heater and hoses to mix with the clean water added to the radiator. Because in a typical cooling system the water pump has the capacity to turn over many times the total system capacity every minute, and the thermostat, when open, will likewise permit many times the system capacity to circulate to the radiator each minute, the fresh water is quickly and thoroughly mixed with the remaining used coolant.

By repeating the sequence of steps, the amount of old coolant and corrosion remaining in the system can be reduced by approximately one-half each time the radiator is emptied. Thus, the first time the radiator is emptied, approximately one-half of the used coolant in the system is removed. After running the engine to mix the remaining used coolant with the fresh water, draining of the radiator reduces the remaining used coolant to one-quarter of that initially contained in the cooling system. The third repetition reduces it to one-eighth; the fourth to one-sixteenth, etc.

In this way, the operator can flush a high percentage of the total old coolant and corrosion from the entire cooling system (not just the radiator) without the need to open drain cocks or hose connections on the engine.

While mechanically simpler, however, this method requires a great deal of time.

Prior art devices are designed to remove fluids for disposal or to treat the fluids and then return the fluids back into the system at the time the equipment is attached. These inventions do not have the capability of removing, containing, storing and reinstalling the fluids at a later time without the necessity of special adaption or modification to the cooling system.

While there are clearly good reasons to flush out and recharge cooling systems in accordance with the vehicle maker's recommendations, many car owners do not do so because of the attendant difficulty of the task. Therefore, there are a great number of vehicles that are not serviced properly and regularly resulting in: (1) poorer performance and more frequent maintenance; (2) shortened engine life; and (3) more frequent operating failures. Such costs could be reduced by providing an efficient way of properly flushing the cooling systems and recharge it with fresh antifreeze.

SUMMARY

In view of the foregoing, it is an object of the present invention to provide a method and apparatus for effectively extracting and injecting coolant from an internal combustion engine cooling system.

An advantage of the present invention is the provision of a method and apparatus wherein an engine coolant such as ethylene glycol can be disposed of properly instead of spilling into the environment.

An advantage of the present invention is the provision of a method and apparatus that eliminates skin contact with an engine coolant such as ethylene glycol.

Another advantage of the present invention is the provision of a method and apparatus which eliminates splashing and possible eye contact with an engine coolant such as ethylene glycol.

A further advantage by the present invention is the provision of a method and apparatus for facilitating the transportation of an engine coolant such as ethylene glycol to a proper disposal site.

Yet another advantage of the present invention is the provision of a method and apparatus to safely draw off pressure and expanded engine coolant from hot pressurized radiators.

A further advantage of the present invention is the provision of a method and apparatus to save time in draining and refilling an internal combustion engine cooling system.

A further advantage of the present invention is the provision of a method and apparatus whereby automobile coolant and water can be mixed before filling an automobile radiator.

Yet another advantage of the present invention is the provision of a method and apparatus that saves money by eliminating spills of used coolant which could have been reused but must then be replaced with new coolant.

A further advantage of the present invention is the provision of a method and apparatus which allows an automotive service technician and his shop to stay clean so as to present a professional appearance.

A further advantage of the present invention is the provision of a method and apparatus for convenient, economical temporary storage of automobile coolant.

A further advantage of the present invention is the provision of a method and apparatus whereby the invention can be easily moved to a new location and then operated.

Yet another advantage of the present invention is the provision of a method and apparatus whereby many different fluids can be removed from a container.

A further advantage of the present invention is the provision of a method and apparatus which can thoroughly drain an automobile coolant system of all coolant.

A further advantage of the present invention is the provision of a method and apparatus that is powered by equipment commonly found in an automobile repair shop such as "shop air."

Yet another advantage of the present invention is the provision of a method and apparatus that is relatively easy to use.

Still another advantage of the present invention is the provision of a method and apparatus that provides a quick and simple way for the removal of the coolant into a container that can be easily detached from the engine and stored out of the way until such time that the coolant is to be reinstalled back into the engine cooling system and then quickly reinstalled with no special adaption.

A further advantage of the present invention is the provision of a method and apparatus for draining and collecting the coolant without the means of the drain cock, or in some cases when no drain cock is provided, without the necessary removal of the lower radiator hose and without significant loss of coolant.

A further advantage of the present invention is the provision of a method and apparatus that will save manufacturers money on warranty repair operations.

A further advantage of the present invention is the provision of a method and apparatus which allows technicians to make repairs quicker, thus warranty time could be reduced.

Still another advantage of the present invention is the provision of a method and apparatus whereby coolant will not be lost, by spillage, which would normally be added to warranty claims, thus saving money on coolant.

A further advantage of the present invention is the provision of a method and apparatus which would provide a more efficient way to install coolant back into the cooling system, by pressure filling from the bottom up. This would prevent trapping pockets of air and would eliminate, in some cases, the need for bleed off points, thus saving expense of incorporating these items in manufacturing.

A further advantage of the present invention is the provision of a method and apparatus that would benefit the manufacturers from the general public's perception that the manufacturer was contributing to environmental protection.

And yet another advantage of the present invention is the provision of a method and apparatus that will greatly reduce the amount of coolant spilled into the environment.

A further advantage of the present invention is the provision of a method and apparatus which would allow the coolant to be easily contained in a closed labeled container (Coolant Extractor/Injector) until such time that the coolant is to be reinstalled into the automobile or transported to on site hazardous waste containers.

A further advantage of the present invention is the provision of a method and apparatus which would allow changes to be made in the dumping of hundreds of millions of gallons of antifreeze each year. Federal and state laws are changing to control this dumping, and the public would welcome these changes.

Still another advantage of the present invention is the provision of a method and apparatus that would cost the manufacturers a very small amount.

A further advantage of the present invention is the provision of a method and apparatus that would possibly cost no more to incorporate in manufacturing than the cost of the now supplied drain cock.

And finally another advantage of the present invention is the provision of a method and apparatus that would allow the cost to be very small in comparison to the large savings the manufacturers would enjoy for the reduced warranty labor time paid to service technicians and the savings on lost coolant during many different repair operations and the elimination of expensive manufacturing of air bleed off points in the cooling systems.

In accordance with features of this Invention, an Extractor/Injector with Coupling, such as for an internal combustion engine cooling system coolant extractor/injector, such as for an internal combustion engine, comprises a vacuum means, a pressurization means, a storage means, and an extraction/injection means including a port or a coupling. In use the vacuum means produces a vacuum by a venturi effect. Air leaves the storage means to fill the vacuum. The storage means is then sealed, leaving the interior of the storage means in a vacuum state.

When the extraction/injection means is flowably connected to the storage means with its port below the surface of the coolant in the cooling system, the coolant passes from the cooling system into the storage means to fill the vacuum there.

In the alternative, the extraction/injection means is flowably connected to the storage means with its coupling sealably and flowably attached to a coupling mate located at the bottom of the radiator or at some other strategic point on the cooling system such as at lowest point of the cooling system or at a more accessible point flowably connected to a dip tube. When so connected, the coolant passes from the cooling system into the storage means to fill the vacuum there.

When the coolant is desired to be injected back into the cooling system, the pressurization means forces air into the storage means where it is stored. The extraction/injection means is then inserted into the cooling system. The extraction/injection means is then sealably and flowably connected to the storage means so that the increased pressure in the storage means injects coolant into the cooling system.

In the alternative, the extraction/injection means is flowably connected to the storage means with its coupling sealably and flowably attached to a coupling mate located at some strategic point of the cooling system, the increased pressure in the storage means injects coolant into the cooling system.

The abovementioned alternatives require a cooling system with a mateable coupling at one or more strategic locations.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views as set forth in the two Indices following the list of Figures at the end of this Brief Description. The drawings are not necessarily to scale, emphasis instead being placed upon illustrating the principles of the invention.

Figure 1:
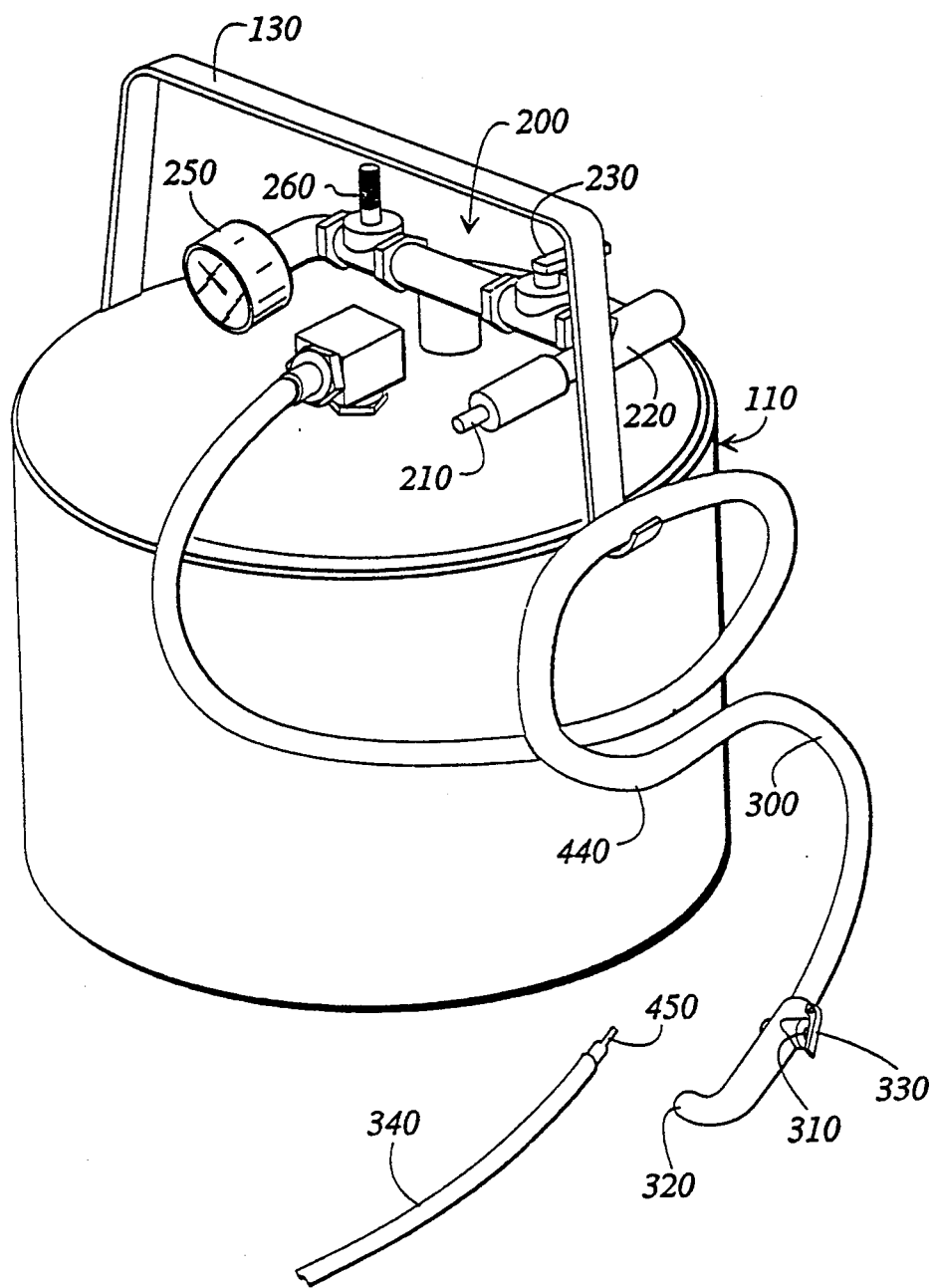
FIG. 1 is a perspective view of a first preferred embodiment of an internal combustion engine coolant extractor/injector, having a pressure control assembly and a tank assembly.

An Index of Reference Characters as well as an Index of Part Names follows:

INDEX OF REFERENCE CHARACTERS

100: Tank Assembly
110: Tank
120: Dip Tube
130: Handle, Tank Assembly
200: Pressure Control Assembly
210: Venturi Connector
220: Venturi Chamber
230: Venturi Rotary Valve
231: Venturi Rotary Valve, 3 position
240: Vacuum Line
250: Gauge, Air Pressure
260: Schraeder Valve
270: T-connector
300: Hose Assembly
310: Valve, Main
312: Valve, 2d Main
315: Valve, Alternate
320: Faucet
322: Port End
324: Hose Connector End
330: Handle, Main Valve
332: Handle, 2d Main Valve
335: Handle, Alternate Valve
340: Transfer Hose
341: Hose Tank End
342: Hose Other End
400: Wand Assembly
440: Wand
450: Wand Connector
500: Coupling Assembly
510: Coupling, Hose (Female)

520: Coupling, Faucet (Male)
560: Coupling, Radiator (Male)
600: Radiator Assembly

INDEX OF PART NAMES

500: Coupling Assembly
520: Coupling, Faucet (Male)
510: Coupling, Hose (Female)
560: Coupling, Radiator (Male)
120: Dip Tube
320: Faucet
250: Gauge, Air Pressure
332: Handle, 2d Main Valve
335: Handle, Alternate Valve
330: Handle, Main Valve
130: Handle, Tank Assembly
300: Hose Assembly
324: Hose Connector End
342: Hose Other End
341: Hose Tank End
322: Port End
200: Pressure Control Assembly
600: Radiator Assembly
260: Schraeder Valve
270: T-connector
110: Tank
100: Tank Assembly
340: Transfer Hose
240: Vacuum Line
312: Valve, 2d Main
315: Valve, Alternate
310: Valve, Main
220: Venturi Chamber
210: Venturi Connector
230: Venturi Rotary Valve
231: Venturi Rotary Valve, 3 position
440: Wand
400: Wand Assembly
450: Wand Connector

DETAILED DESCRIPTION OF THE DRAWINGS

The first preferred embodiment of the internal combustion engine cooling system coolant extractor/injector of FIG. 1 comprises a tank assembly 100, a pressure control assembly 200, and a hose assembly 300. The tank assembly 100 comprises a tank 110 and a dip tube 120. The pressure control assembly 200 comprises a venturi connector 210, a venturi chamber 220, a venturi rotary valve 230, a vacuum line 240, an air pressure gauge 250, a Schraeder valve 260 and a T-connector 270. The hose assembly 300 comprises a main valve 310, a faucet 320, a valve handle 330, a wand 440, a transfer hose 340, and a wand connector 450.

Figure 4:
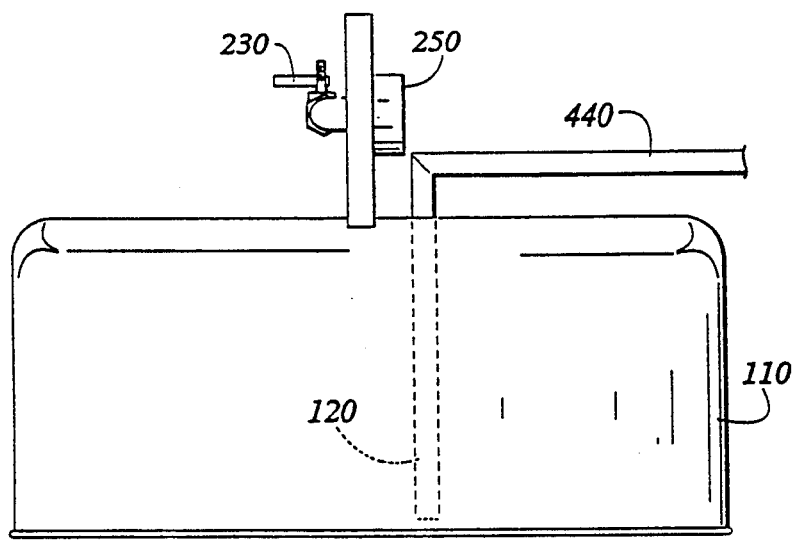
FIG. 4 is a cross-sectional view of the tank assembly of the first preferred embodiment of FIG. 1.
Figure 5:
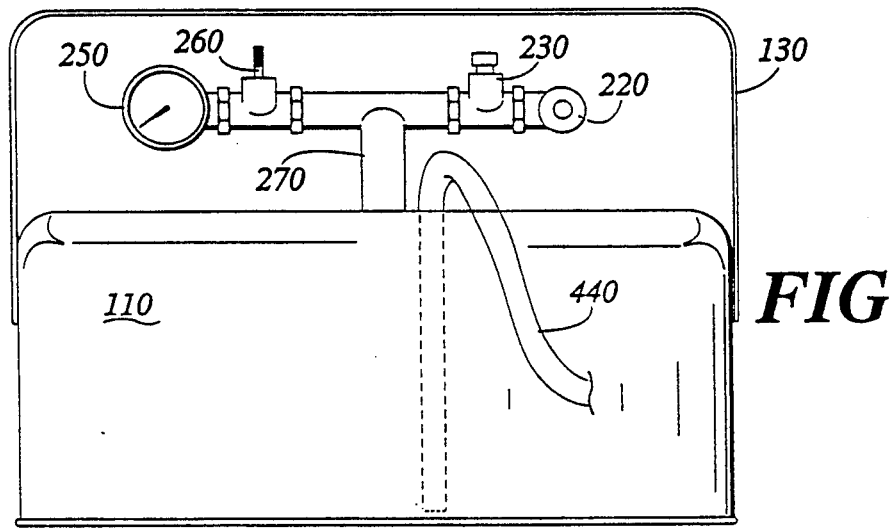
FIG. 5 is a side view of the pressure control assembly of the first preferred embodiment of FIG. 2.

The tank 110 is a closed container that is large enough to hold all of the coolant from an internal combustion engine. Inside the tank 110, as shown in FIG. 4, is the dip tube 120. The dip tube 120 extends from the top of the tank 110 to near the bottom of the tank 110. The lower end of the dip tube 120 is open to allow coolant to pass through it. The top of the dip tube 120 is connected to the transfer hose 340. The opposite end of the transfer hose 340 is connected to the main valve 310. The valve handle 330 can press against the main valve 310 and open the way for coolant to flow through the transfer hose 340. The faucet 320 is attached to the main valve 310, and can connect to the wand connector 450. The wand connector 450 connects the faucet 320 and the wand 440. The wand 440 is a thin flexible tube that can be inserted into, and to the bottom of, a engine internal combustion engine radiator.

Figure 2:
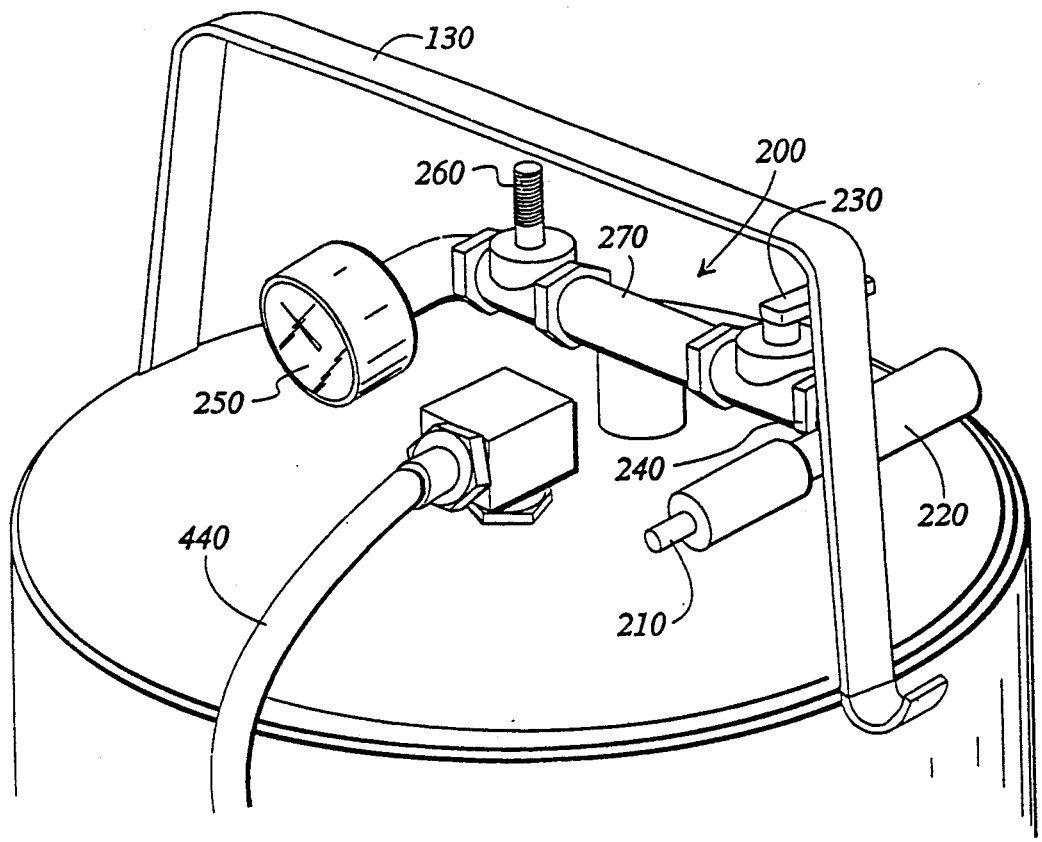
FIG. 2 is a perspective view of the pressure control assembly, having a venturi chamber, of the first preferred embodiment of FIG. 1.

The air pressure control assembly 200, as shown in FIG. 2, controls air pressure in the tank 110. The bottom leg of the T-connector 270 connects the air pressure control assembly 200 to the tank 110. One of the top legs of the T-connector 270 is connected to one end of the venturi rotary valve 230. The other of the top legs of the T-connector 270 is connected to one of the connections of the Schraeder valve 260. One end of the vacuum line 240 is connected to the venturi chamber 220. The venturi connector 210 is also connected to the venturi chamber 220, and allows an air hose to be applied to the venturi chamber 220. The venturi rotary valve 230 is connected to the other end of vacuum line 240. The venturi rotary valve 230 controls the flow of air into or out of the tank 110 by being able to close the vacuum line 240. The Schraeder valve 260 will accept application of an air hose. The air pressure gauge 250 is connected to the other connection of the Schraeder valve 260, and gauges the amount of air pressure or the amount of vacuum inside the tank 110.

Figure 3:
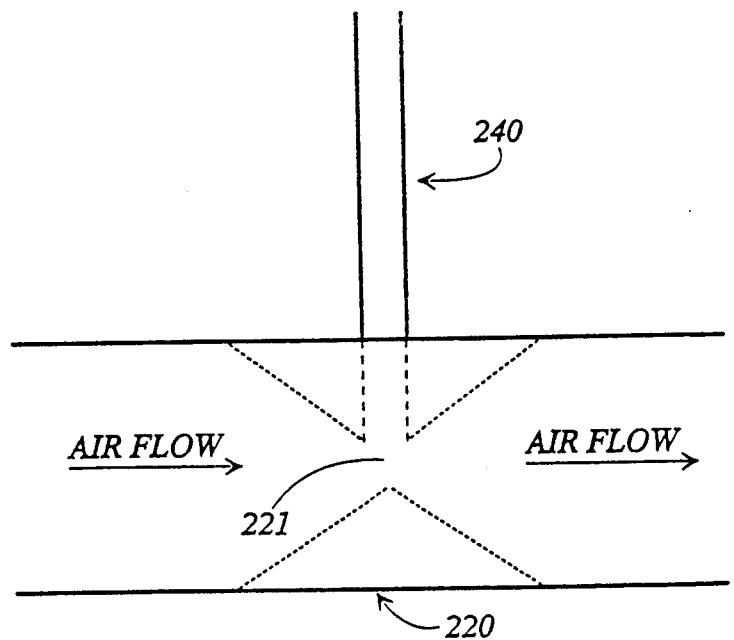
FIG. 3 is a cross-sectional view of the venturi chamber of the first preferred embodiment of FIG. 2.

To extract the coolant from a cooling system a vacuum is first established in the tank 110. To establish a vacuum in the tank 110 the main valve 310 should be closed, and the venturi rotary valve 230 should be open. A compressed air supply hose is connected to the venturi connector 210. Air from the air supply hose is blown through the venturi connector 210 into the venturi chamber 220. The interior of the venturi, as shown in FIG. 3, chamber 220 is shaped like two cones touching point to point at a connecting point 221, with the vacuum line 240 intersecting at the connecting point 221. When air blows from the venturi connector 210 through the constricted opening at the connecting point 221, a vacuum is created in the vacuum line 240 by the venturi effect. This vacuum evacuates the air from the tank 110. The air pressure gauge 250 measures the amount of vacuum in the tank 110. When the air pressure gauge 250 reads the desired air pressure, the venturi rotary valve 230 is closed so that the vacuum is maintained in the tank 110. The air hose may then be disconnected from the venturi connector 210.

The wand 440 is then inserted into the radiator of the internal combustion engine and pushed to the bottom of the radiator. The main valve 310 is then opened by pressing on the valve handle 330. The vacuum in the tank 110 causes coolant to be evacuated from the radiator, through the wand 440, through the main valve 310, through the transfer hose 340, through the dip tube 120 and into the tank 110. When the air pressure inside the tank 110 is equal to the air pressure inside of the cooling system, or when the fluid is substantially removed from the cooling system, the fluid flow will cease. The valve handle 330 can then be released closing the main valve 310. Virtually all of the coolant from the cooling system should now be inside of the tank 110.

When desired the coolant can be injected back into the cooling system by connecting an air hose to the Schraeder valve 260. Then the tank 110 is pressurized until it reaches the desired pressure. The wand 440 is disconnected from the transfer hose 340 and the open end of the transfer hose 340 is inserted into the radiator. The valve handle 330 is then pressed, opening the main valve 310. The air pressure in the tank 110 will force the coolant out of the tank 110. The only exit is up through the dip tube 120. Thus the coolant will leave the tank 110 through the dip tube 120, into the transfer hose 340, through the main valve 310, and into the cooling system.

Figure 6:
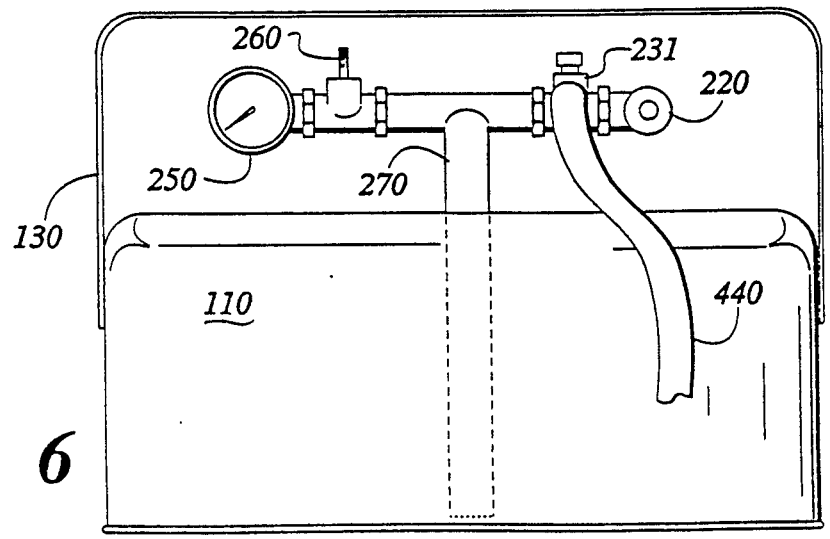
FIG. 6 is a side view of a pressure control assembly of a 2d preferred embodiment of an internal combustion engine coolant extractor/injector.

A 2d preferred embodiment of the internal combustion engine cooling system coolant extractor/injector of FIG. 6 comprises the tank assembly 100, a 2d pressure control assembly 201, and the hose assembly 300. It is virtually identical to the 1st preferred embodiment except that the pressure control assembly 201 is attached at the top of the dip tube 120. There is no provision for the existence of an opening to coincide with the opening associated with the point of attachment of the pressure control assembly 200 in the first preferred embodiment.

The 2d pressure control assembly 201 is virtually identical to the first pressure control assembly 200. A difference is that the venturi gate valve 230 is replaced with a 3 position venturi gate valve 231.

The 3 position venturi gate valve 231 has three ports. One port is flowably connected to the venturi chamber 220 as in the first preferred embodiment. Another port is closed. The third (3d) port of the venturi gate valve 231 is flowably connected to the end of the transfer hose 340 which is the first preferred embodiment was attached to the top end of the dip tube 120, now connected to the 2d pressure control assembly 201.

The hose assembly 300 of the 2d preferred embodiment may be identical to the hose assembly 300 of the first preferred embodiment. However, the main valve 310 may be omitted. On the other hand, availability of the main valve 310 could be convenient.

Figure 7:
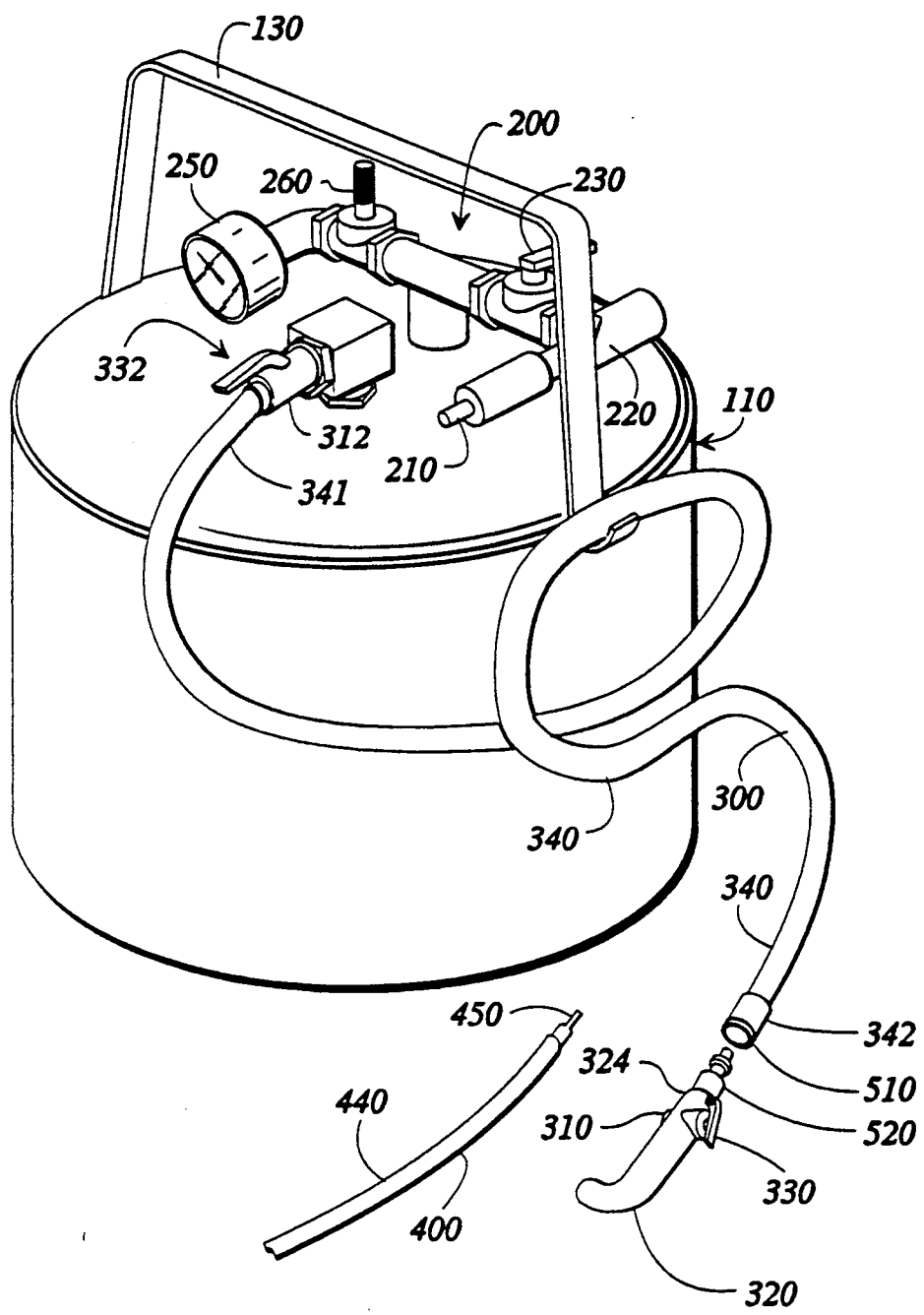
FIG. 7 is a perspective view of a 3d preferred embodiment of an internal combustion engine coolant extractor/injector, having a coupling for connection to a radiator mating coupling.
Figure 8:
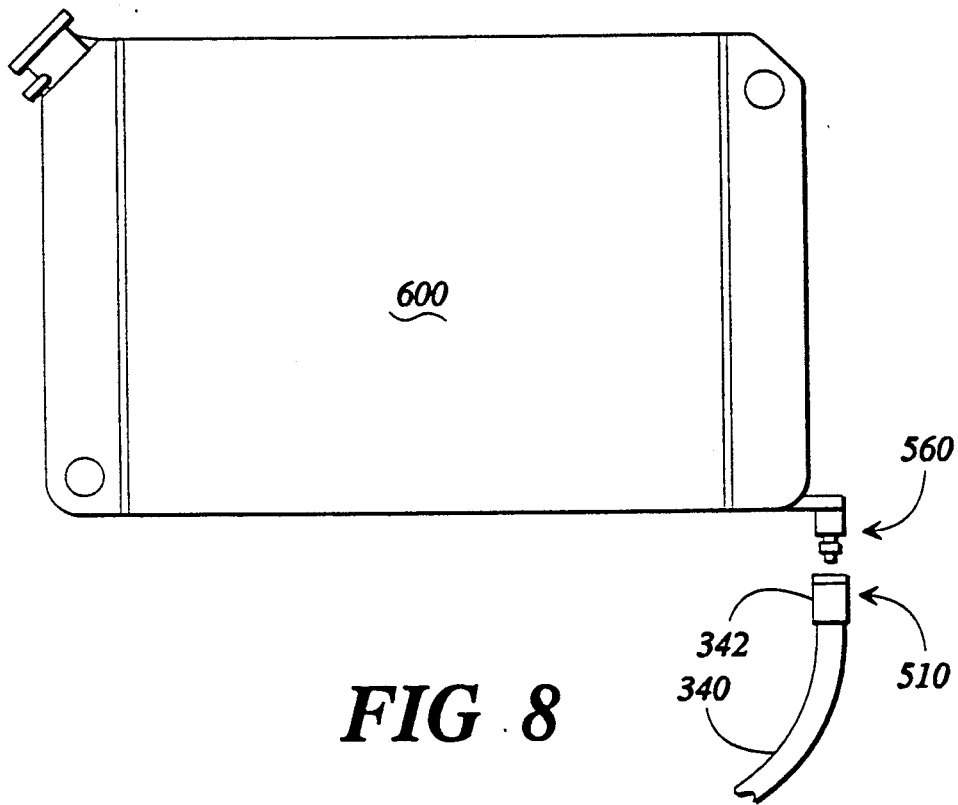
FIG. 8 is a side view of the radiator showing the mating coupling of the 3d preferred embodiment of FIG. 7 which is the 1st preferred embodiment of a coupled cooling system.
Figure 9:
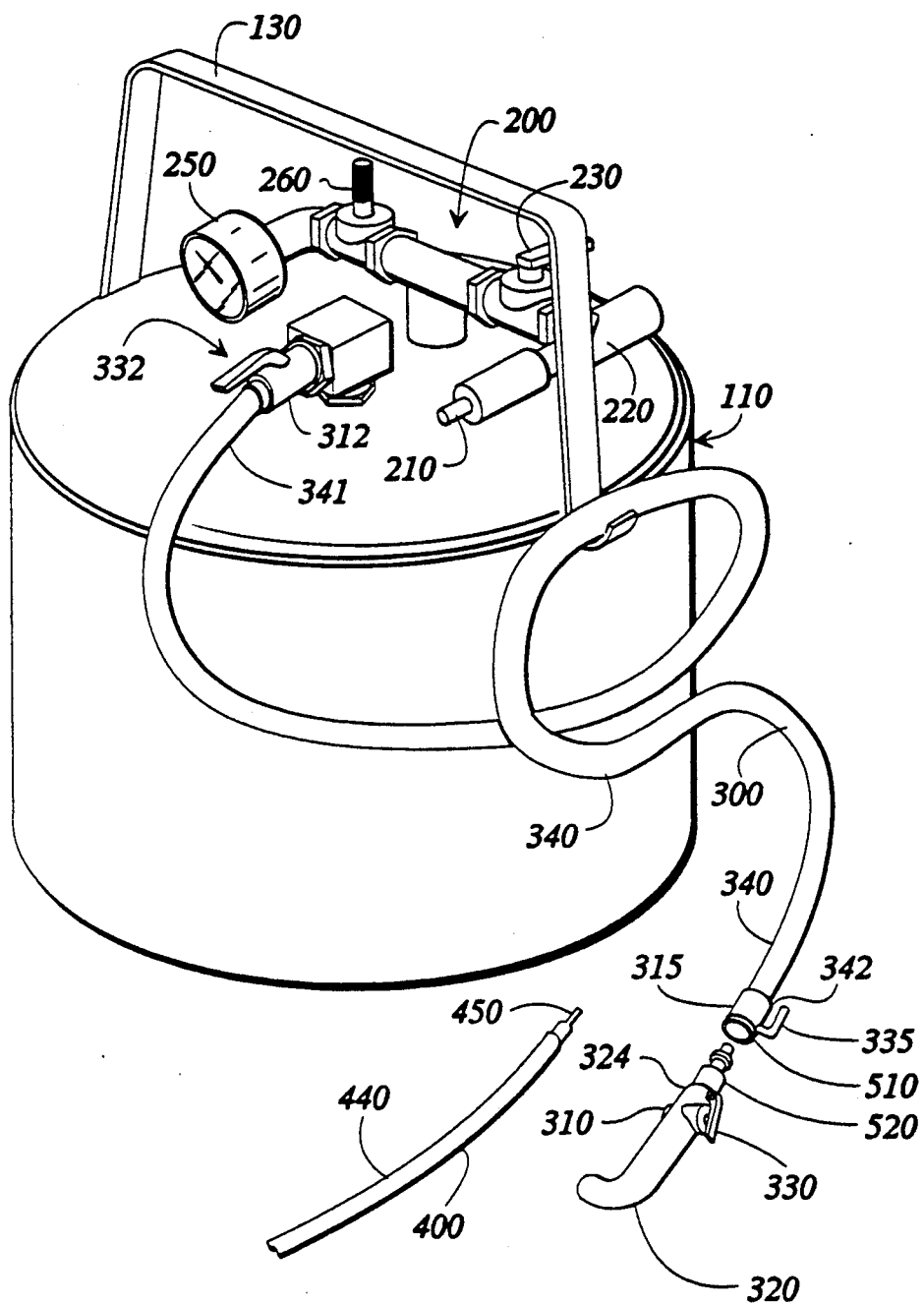
FIG. 9 is a perspective view of a 4th preferred embodiment of an internal combustion engine coolant extractor/injector, showing a position for an alternative valve.

A 3d preferred embodiment as shown in FIG. 7, FIG. 8 and FIG. 9 has the addition of a coupling at one end of the hose assembly. There is a mating connector on the faucet as well as at least one mating connector on the cooling system providing the ability of connecting the transfer hose either to the faucet or to the radiator and/or a low point of the cooling system. Adapters which would match the coupling on the hose assembly could allow for attaching that hose end to any type of coupling which might be found on the cooling system. An additional valve placed somewhere in the hose assembly or flowably in line with the hose assembly path would perform the function of the main valve.

It is important that FIG. 8 teaches a cooling system with one or more couplings, each flowably and sealably connected at a strategic point of the cooling system.

Thus the hose assembly 300 of the 3d preferred embodiment of FIG. 7 may be identical to the hose assembly 300 of the first preferred embodiment, except however, the main valve 310 is supplemented by a 2d main valve 312 so that the transfer hose 340 may be used without the faucet 320. The coupling joining the transfer hose 340 and the faucet 320 is a quick connect coupling. In this embodiment the hose coupling 510 is the female and the faucet coupling 520 is the male. This allows connection of the hose coupling 510 to a radiator coupling 560 of FIG. 8 which is also a male quick connect coupling.

The hose assembly 300 of the 4th preferred embodiment of FIG. 9 may be identical to the hose assembly 300 of the 3d preferred embodiment of FIG. 7, except however, the 2d main valve 312 is supplemented by or replaced by an alternate valve 315 so that the transfer hose 340 may be used without the faucet 320 as well as without the 2d main valve. Again, the coupling joining the transfer hose 340 and the faucet 320 is a quick connect coupling. In this embodiment the hose coupling 510 is the female and the faucet coupling 520 is the male. This allows connection of the hose coupling 510 to a radiator coupling 560 of FIG. 8 which is also a male quick connect coupling.

While the invention has been particularly shown and described with reference to the preferred embodiments thereof, it will be understood by those skilled in the art that various alterations in form and detail may be made therein without departing from the spirit and scope on the invention.

The embodiments of the invention in which an exclusive property or privilege is claimed are defined as follows:

1. An apparatus for a coolant extractor/injector with coupling such as for transportation of the coolant to and/or from an internal combustion engine cooling system, using a portable tank assembly comprising:
   a cooling system having at least one coupling means at or near the lowest point of the cooling system or at some other strategic point of the cooling system,
   a tank with a top opening and a dip tube the top end of which is on the inside of the tank and which is connected to the tank top opening and using a pressure control assembly which is on the outside of the tank and which is connected to the tank top opening, comprising a venturi connector, a venture chamber connected to the venturi connector, and an air pressure gauge connected to the tank top opening,
   means associated with said pressure control assembly
      for maintaining a pressure inside of said tank above or below the pressure outside of said tank independent of the presence of an operator and
      for moving a liquid into the tank or out of the tank independent of the source of gaseous pressure,
   a closeable transfer hose assembly
      one end of which is connected to the top end of the dip tube,
      the other end of which has a coupling means which will sealably and flowably mate with any of the coupling means on the cooling system.

2. The apparatus of claim 1, wherein said control means comprises:
   a venturi valve, connected between the venturi chamber and the tank top opening, and
   a quick connect valve, connected to the tank top opening.

3. The apparatus of claim 1, wherein the transfer hose assembly comprises:
   a coupling means and
   a transfer hose and
   a main valve, the coupling means, the hose and the main valve being sealably and flowably connected in line with the coupling on one end.

4. A method of extracting and injecting coolant such as for transportation of the coolant to and/or from an internal combustion engine cooling system, said method comprising the steps of:
   introducing a vacuum in a tank assembly having a tank and a hose means;
   storing the vacuum in the tank without the presence of an operator;
   sealably and flowably connecting the hose coupling means to one of the cooling system coupling means;
   drawing the coolant through the hose means into the tank under the influence of the vacuum;
   disconnecting the hose coupling means from the cooling system coupling means;

temporarily storing the coolant in the tank;
introducing gaseous pressure into the tank;
storing the pressure in the tank; without the presence of an operator;
sealably and flowably reconnecting the hose coupling means to one of the cooling system coupling means; and
returning the coolant to its original environment from the tank through the hose means under the influence of the pressure.

5. An apparatus for a coolant extractor/injector with coupling for transportation of the coolant to and/or from an internal combustion engine cooling system using a portable tank assembly comprising:

a cooling system having at least one coupling at or near the lowest point of the cooling system or at some other strategic point of the cooling system, a tank with a top opening and a dip tube the top end of which is on the inside of the tank and which is connected to the tank top opening and using a pressure control assembly which is on the outside of the tank and which is connected to the tank top opening, comprising a venturi connector, a venturi chamber connected to the venturi connector, and an air pressure gauge connected to the tank top opening, means associated with said pressure control assembly
for maintaining a pressure inside of said tank above or below the pressure outside of said tank independent of the presence of an operator and
for moving a liquid into the tank or out of the tank independent of the source of gaseous pressure, and a transfer hose assembly
one end of which is connected to the control means,
the other end of which has a coupling means which will sealably and flowably mate with the couplings on the cooling system.

* * * * *

UNITED STATES PATENT AND TRADEMARK OFFICE
CERTIFICATE OF CORRECTION

PATENT NO. : 5,329,982
DATED : July 19, 1994
INVENTOR(S) : Gerry E. Payne

It is certified that error appears in the above-indentified patent and that said Letters Patent is hereby corrected as shown below:

On title page, item "[63]" Related U.S. Application Data which reads "Continuation-in-part of Ser. No. 760,709, Sep. 16, 1991, Pat. No. 5,242, 3 73."

The correct Patent Number is:
Pat. No. 5,242, 2 73.

Signed and Sealed this

Tenth Day of January, 1995

Attest:

BRUCE LEHMAN

Attesting Officer

Commissioner of Patents and Trademarks